United States Patent
Hamada et al.

(10) Patent No.: US 9,213,759 B2
(45) Date of Patent: Dec. 15, 2015

(54) SYSTEM, APPARATUS, AND METHOD FOR EXECUTING A QUERY INCLUDING BOOLEAN AND CONDITIONAL EXPRESSIONS

(75) Inventors: Shinsuke Hamada, Tokyo (JP); Yasuhiro Tahara, Tokyo (JP); Kouji Kimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 14/006,233

(22) PCT Filed: Jun. 3, 2011

(86) PCT No.: PCT/JP2011/062774
§ 371 (c)(1),
(2), (4) Date: Sep. 19, 2013

(87) PCT Pub. No.: WO2012/164738
PCT Pub. Date: Dec. 6, 2012

(65) Prior Publication Data
US 2014/0012879 A1 Jan. 9, 2014

(51) Int. Cl.
*G06F 17/30* (2006.01)
(52) U.S. Cl.
CPC .... *G06F 17/30678* (2013.01); *G06F 17/30483* (2013.01); *G06F 17/30542* (2013.01); *G06F 17/30595* (2013.01)
(58) Field of Classification Search
CPC .......... G06F 17/30678; G06F 17/30483; G06F 17/30542; G06F 17/30595
USPC .............. 707/758, 769, 780, 999.3
See application file for complete search history.

(56) References Cited

U.S. PATENT DOCUMENTS 6,081,799 A * 6/2000 Beavin et al. ............. 707/999.2
8,688,682 B2 * 4/2014 Faunce et al. ............. 707/713

FOREIGN PATENT DOCUMENTS

| JP | 62-159222 | 7/1987 |
| JP | 04-052967 | 2/1992 |
| JP | 05-174063 | 7/1993 |

OTHER PUBLICATIONS

PCT International Search Report on application PCT/JP2011/062774 mailed Aug. 30, 2011; 2 pages.

* cited by examiner

*Primary Examiner* — Hares Jami
(74) *Attorney, Agent, or Firm* — Foley & Lardner LLP

(57) ABSTRACT

A DBMS is configured to identify a Boolean expression and conditional expressions from a search query, and to extract for each of the identified conditional expressions the value of a record ID conforming to a conditional expression. The DBMS is configured to change a conformity result value corresponding to the extracted record ID and conditional expression to a first value signifying conformity, in Boolean expression determination information, which is information that includes a determination set having a record ID value and a plurality of conformity result values respectively corresponding to a plurality of conditional expressions, and, on the basis of the Boolean expression, to perform logical operations on the plurality of conformity result values of a determination set, for each determination set in the Boolean expression determination information.

9 Claims, 14 Drawing Sheets

| Record ID | C1 | C2 | C3 |
|---|---|---|---|
| 1 | 4 | 3 | 2 |
| 2 | 35 | 4 | 30 |
| 3 | 20 | 10 | 100 |
| 4 | 9 | 2 | 80 |
| 5 | 25 | 1 | 50 |
| 6 | 11 | 8 | 38 |
| 7 | 2 | 9 | 4 |
| ⋮ | ⋮ | ⋮ | ⋮ |

Columns: 110a, 110b, 110c, 110d. Rows: 101a–101g.

Fig. 3B

C1 index 100a

| C1 | Record ID |
|---|---|
| 8 | 210 |
| 10 | 100 |
| 25 | 170 |
| ..... | |

C2 index 100b

| C2 | Record ID |
|---|---|
| 1 | 125 |
| 2 | 34 |
| 12 | 310 |
| ..... | |

C3 index 100c

| C3 | Record ID |
|---|---|
| 12 | 50 |
| 30 | 23 |
| 60 | 125 |
| ..... | |

Fig. 6

| Record ID | Conditional expression ID | | | Logical operation result |
|---|---|---|---|---|
| | X1 | X2 | X3 | |
| 1 | False | True | False | False |
| 2 | True | True | False | True |
| 3 | True | False | True | True |
| 4 | False | True | True | False |
| 5 | True | True | True | True |
| 6 | True | False | False | False |
| ⋮ | ⋮ | ⋮ | ⋮ | ⋮ |

SYSTEM, APPARATUS, AND METHOD FOR EXECUTING A QUERY INCLUDING BOOLEAN AND CONDITIONAL EXPRESSIONS

TECHNICAL FIELD

The present invention relates to database management technology.

BACKGROUND ART

A Relational Database (hereinafter referred to as "RDB") is known as a data storage system for a database (hereinafter referred to as "DB"). The RDB is configured to manage data using a table configured from a plurality of records having a plurality of columns. Each record generally has a record ID (identification) that enables the record to be uniquely identified.

As a system for retrieving data from a DB, there is a database management system (hereinafter referred to as "DBMS"). The DBMS is configured to receive a search query and to extract the desired data from the DB using a search expression described in the search query.

Patent Literature 1 discloses a system for extracting desired data using a SQL (Structured Query Language) as the search query.

CITATION LIST

Patent Literature

[PTL 1]
U.S. Pat. No. 6,081,799 (description)

SUMMARY OF INVENTION

Technical Problem

FIG. 14 shows an example of a conventional retrieval system. A conventional retrieval system such as that disclosed in Patent Literature 1, for example, will be described hereinbelow using FIG. 14. In FIG. 14, reference signs assigned to elements of the same type are configured by combining a parent sign and a child sign, but in the following description, only a parent sign will be used when no particular distinction is made between same type elements.

A search expression (hereinafter Boolean expression) 902 is described in a search query 900. The Boolean expression 902 is configured by combining a plurality of conditional expressions. The DBMS is configured to extract the record ID of each record satisfying the conditional expression 901 of the search query 900, and to create a list 920 of record IDs for each conditional expression 901 (911). The DBMS is configured to sort the list 920 of record IDs for the conditional expressions 901, and to create a sorted record ID list 921 (912). The DBMS is configured to perform logical operations on sorted record ID lists 921a through 921c for conditional expressions 901a through 901c on the basis of the Boolean expression 902, and to create a list 922 of record IDs for which logical operations have been completed that includes a record ID for which the result of the operation is "true".

In accordance with the above processing, the DBMS is able to extract a record ID conforming to a search query 900 from an RDB.

However, when record IDs satisfying the conditional expression are numerous, the data size of the record ID list increases, making it impossible for the above-described system to complete sorting processing using only a main memory apparatus (for example, a memory). In this case, sorting must be performed using an auxiliary storage apparatus (for example, an HDD (Hard Disk Drive) or a flash memory) having a larger storage capacity than the main storage apparatus. However, since the data input/output speed of the auxiliary storage apparatus is slower than that of the main storage apparatus, the time required for sorting is prolonged. That is, the retrieval process takes a long time.

Accordingly, an object of the present invention is to shorten the time required for processing for retrieving from a DB data that conforms to a search expression configured by combining a plurality of conditional expressions.

Solution to Problem

A database management system (DBMS) is configured to identify a Boolean expression and conditional expressions from a search query, and to extract for each of the identified conditional expressions the value of a record ID conforming to a conditional expression. The DBMS is configured to change a conformity result value corresponding to an extracted record ID and a conditional expression to a first value that signifies conformity in Boolean expression determination information, which is information that includes a determination set having a record ID value and a plurality of conformity result values respectively corresponding to a plurality of conditional expressions, and, on the basis of the Boolean expression, to perform logical operations on the plurality of conformity result values of a determination set for each determination set in the Boolean expression determination information. The DBMS is configured to retrieve from a table specified in the search query a record corresponding to a record ID value that conforms to the record ID value of the determination set for which the first value signifying conformity is obtained as the result of the logical operation, and to output search result information related to the result of the search. A second storage apparatus is configured to store the above-mentioned table, and a first storage apparatus having a faster data input/output speed than the second storage apparatus is configured to store the Boolean expression determination information. The first storage apparatus, for example, is a main storage apparatus, and the second storage apparatus, for example, is an auxiliary storage apparatus.

BRIEF DESCRIPTION OF DRAWINGS

FIG. 3A shows an example of a table T1, and FIG. 3B shows an example of an index 100.

FIG. 6 shows an example of a Boolean expression determination table 26.

DESCRIPTION OF EMBODIMENTS

Figure 1:
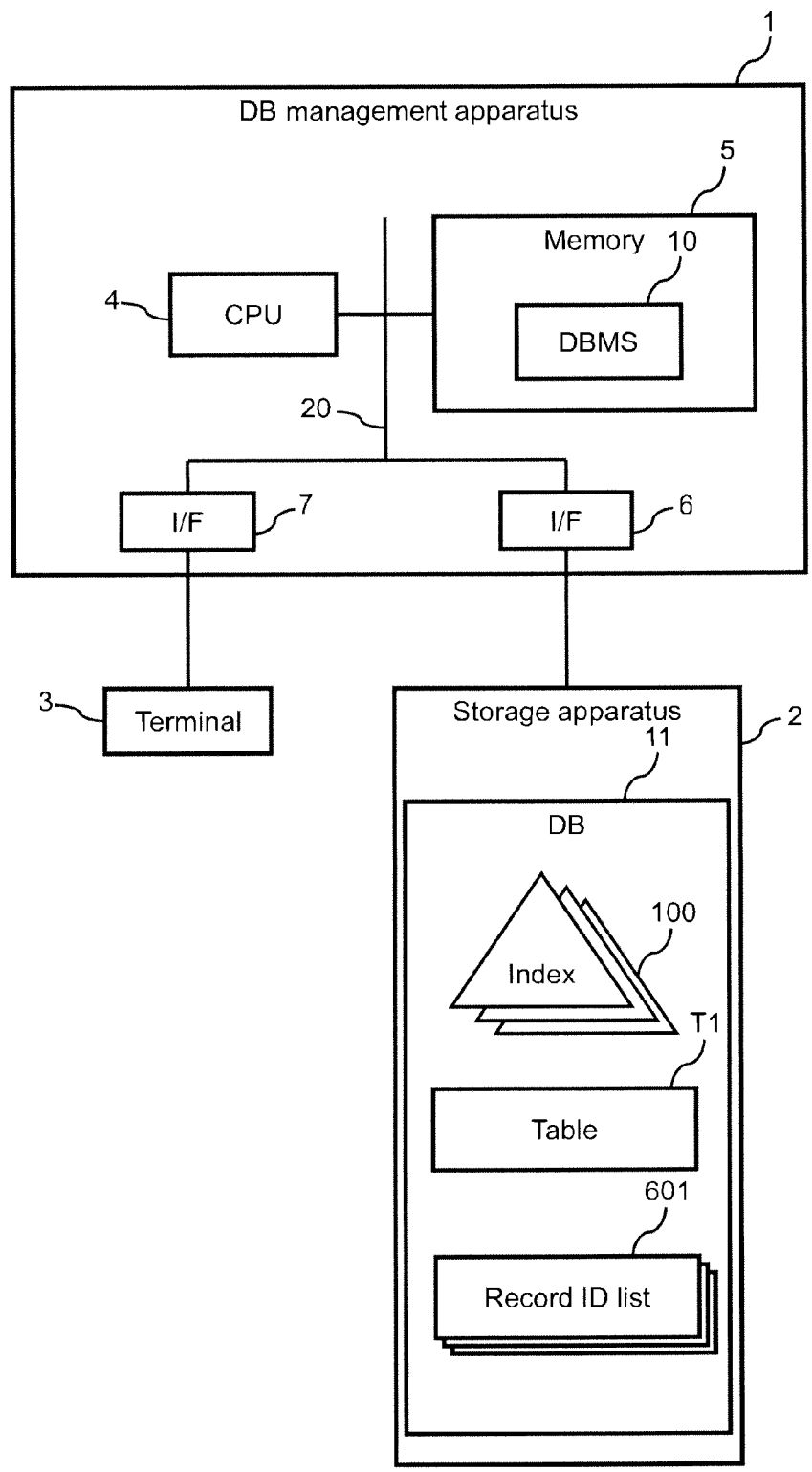
FIG. 1 shows an example of the configuration of a DB management apparatus related to an embodiment of the present invention.

FIG. 1 shows an example of the configuration of a DB management apparatus related to an embodiment of the present invention.

The DB management apparatus 1 is configured to receive a search query, to retrieve from a table in a DB 11 data conforming to a search expression (Boolean expression) described in this search query, and to output the search result (for example, information representing the number of pertinent records, and information in the pertinent records). The search query is input from an external apparatus. The external apparatus may be an input apparatus (not shown in the drawing) or a storage media, but in this embodiment is a communication terminal (hereinafter, terminal 3) that communicates with the DB management apparatus 1.

The DB management apparatus 1 is a computer, and comprises a CPU 4, a memory 5, a device interface (hereinafter, referred to as "I/F") 6, and a communication I/F 7. These components are connected to one another via a bus 20. Each component will be described hereinbelow.

The CPU (Central Processing Unit) 4 is configured to execute a computer program (hereinafter referred to as "program") stored in either the memory 5 or the storage apparatus 2. For example, the CPU 4 is configured to execute a DBMS 10 and to implement a computer as the DB management apparatus 1. The DBMS 10 will be described in detail further below. In the following description, there may be cases where a program (specifically, for example, a DBMS or a function thereof) is used as a subject to explain processing, but since the stipulated processing is performed in accordance with a program being executed by a processor (for example, the CPU 4) while using a storage resource (for example, the memory 5) and the I/F 6 and/or the I/F 7 as needed, the processor may also be used as the subject to explain the processing. A process, which is described having the program as the subject, may be regarded as a process performed by the DB management apparatus 1. In addition to the CPU 4, the processor may also include a hardware circuit that carries out either part or all of the processing performed by the CPU 4. The program may be installed in respective computers from a program source. The program source, for example, may be either a program delivery server or a computer readable storage medium.

The memory 5 is an example of a main storage apparatus, and, for example, is a volatile memory. Therefore, a program and data stored in the memory 5 are deleted when the power supply to the memory is interrupted. Normally, the memory 5 is able to input and output data faster than the storage apparatus 2. The memory 5, for example, is a DRAM (Dynamic Random Access Memory).

The storage apparatus 2 is an example of an auxiliary storage apparatus, and, for example, is a nonvolatile storage apparatus. Therefore, data stored in the storage apparatus 2 is not deleted even when the power supply to the storage apparatus 2 is interrupted. The storage apparatus 2 normally has a larger storage capacity than the memory 45. Therefore, a DB 11 having a large data size is normally stored in the storage apparatus 2. The DB 11 includes a table T1, a plurality of indexes 100 respectively corresponding to a plurality of columns of the table T1, and a plurality of record ID lists 601 respectively corresponding to a plurality of conditional expressions described in a search query. The storage apparatus 2 may be an external media drive such as a HDD or a flash memory, or may be a RAID storage system (for example, a disk array apparatus) having a plurality of media drives. The storage apparatus 2 shown in FIG. 1 is arranged outside of the DB management apparatus 1, but The storage apparatus 2 is not limited thereto. For example, the storage apparatus 2 may be arranged inside the DB management apparatus 1. A plurality of storage apparatuses 2 may also be arranged. Also, for example, the list 601 need not be included in the DB 11.

The device I/F 6 is configured to couple the DB management apparatus 1 to the storage apparatus 2. The DB management apparatus 1 is able to input and output data to the storage apparatus 2 via the device I/F 6. The device I/F 6, for example, may be a Serial ATA port, PCI Express port, SCSI port, or USB port. A plurality of device I/Fs 6 may be provided.

The communication I/F 7 is configured for the DB management apparatus 1 to communicate with an external communication device. The DB management apparatus 1 is able to communicate via the communication I/F 7 with either one or a plurality of terminals 3 connected, for example, to a communication network. The communication I/F 7, for example, may be a LAN (Local Area Network) port. A plurality of communication I/Fs may be provided.

The terminal 3 is an information processing apparatus that is configured to send a search query to the DB management apparatus 1 and to obtain a search result from the DB management apparatus 1. The terminal 3, for example, may be a personal computer or a mobile telephone or the like.

Figure 2:
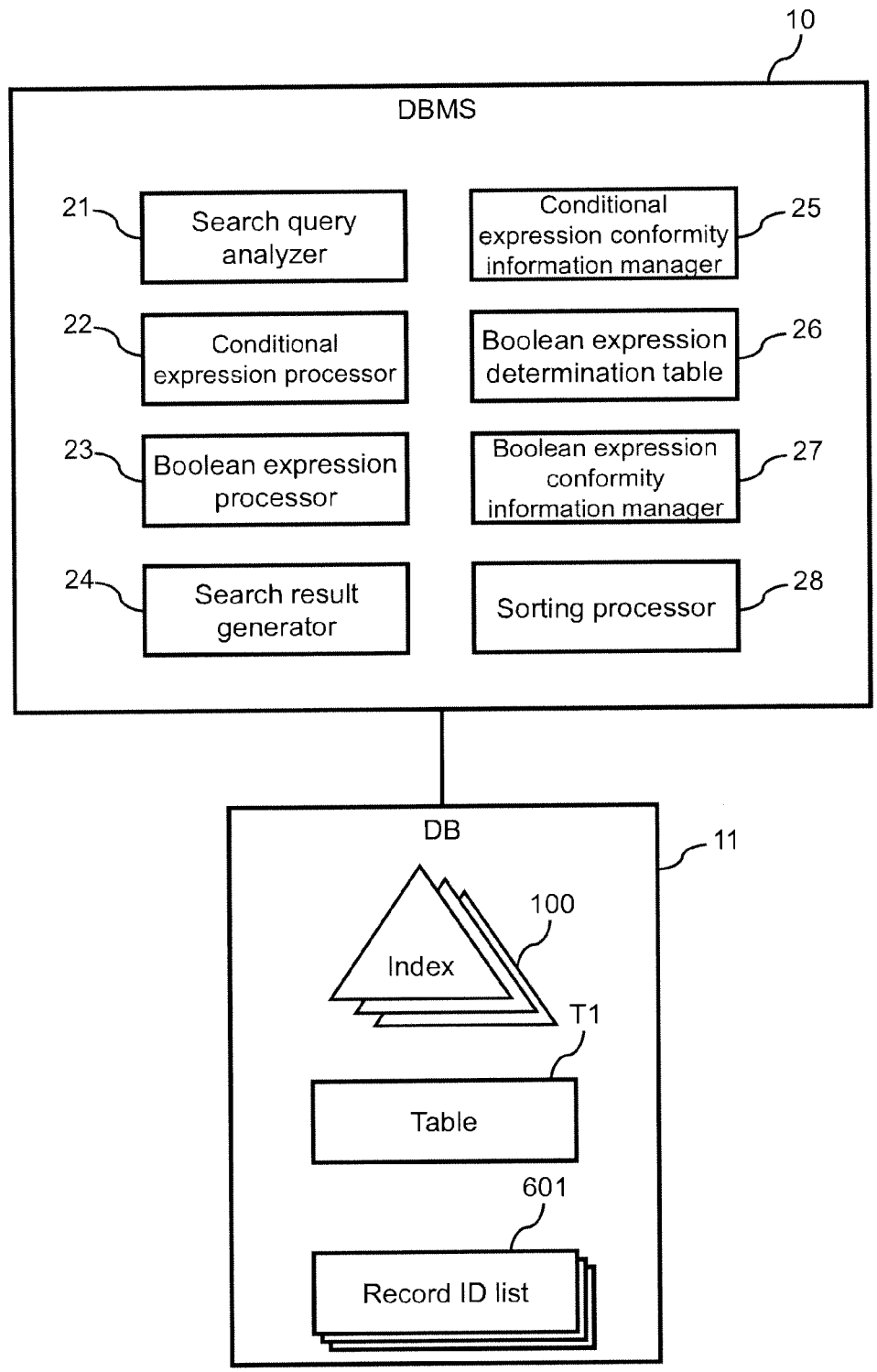
FIG. 2 shows an example of a functional block of a DBMS 10.

FIG. 2 shows an example of a functional block of a DBMS 10.

The DBMS 10 comprises a search query analyzer 21, a conditional expression processor 22, a Boolean expression processor 23, a search result generator 24, and a sorting processor 28 (the processing performed by each functional block will be described subsequently). The DBMS 10 is configured to prepare a Boolean expression determination table 26 in the memory 5, and, in addition, to reserve areas in the memory 5 to serve as a conditional expression conformity information manager 25 and a Boolean expression conformity information manager 27.

The DB 11, as described hereinabove, includes a table T1, a plurality of indexes 100, and a plurality of record ID lists 601.

FIG. 3A shows an example of the table T1 stored in the DB 11. In a number of the drawings to include FIG. 3, reference signs assigned to elements of the same type are configured by combining a parent sign and a child sign, but in the following description, only a parent sign will be used when no particular distinction is made between same type elements.

The table T1 is configured from a plurality of records 101 having a plurality of columns 110. A record 101 has values for a "record ID" column 110a, a "C1" column 110b, a "C2" column 110c, and a "C3" column 110d. Here, the value of the "record ID" column 110a is an ID (identification) that enables the record to be uniquely identified. Hereinafter, the value of the "record ID" column 110a will be referred to as "record ID value". The value of the "C1" column 110b will be referred to as "C1 value". The same will hold true for the other column values.

FIG. 3B shows an example of an index 100.

There is a plurality of a plurality of indexes 100a through 100c respectively corresponding to the plurality of columns "C1" through "C3". An index 100 is configured from a plurality of entries. An entry of an index 100 (for example, 100a) is registered with the value of a column corresponding to the index 100 (for example, "8" as the value of "C1"), and a record ID (for example, "210") of the record (record inside table T1) in which this value is registered.

Figure 4:
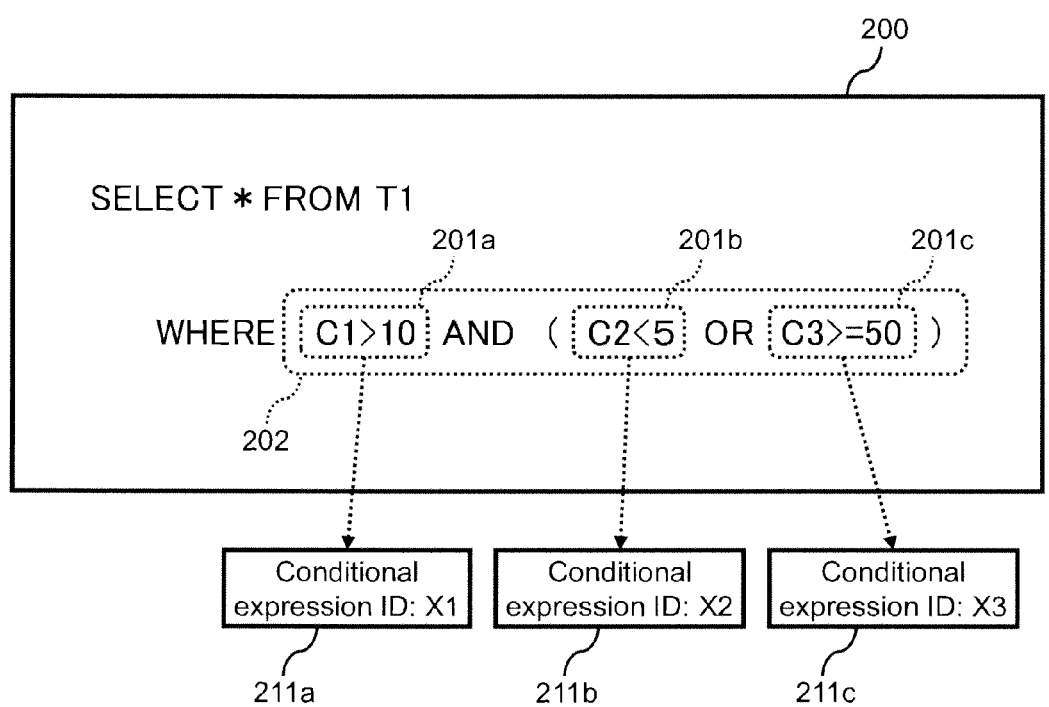
FIG. 4 shows an example of a search query.

FIG. 4 shows an example of a search query.

A search query 200 is a query in which a search expression (Boolean expression) for extracting desired data from the DB 11 is described, and, for example, is described using SQL.

The search query 200 shown in FIG. 4 signifies the selection from table T1 (100) of a record that conforms to a Boolean expression 202, which is a combination of conditional expressions 201a through 201c. The Boolean expression 202 is described in the search query 200, and the Boolean expression 202 is normally a combination of a plurality of conditional expressions 201. The conditional expression 201, for example, may include at least one of an arithmetic operator, a relational operator, or a function. The Boolean expression 202, for example, may include at least one of a logical operator or a function.

The DB management apparatus 1 is configured to receive a search query from the terminal 3, and the DMBS 10 is configured to analyze the search query. Specifically, for example, the search query analyzer 21 is configured to analyze the search query 200, and to extract conditional expression 201a "C1>10", conditional expression 201b "C2<5", and conditional expression 201c "C3≤50". Then, the search query analyzer 21 assigns, to the extracted conditional expressions 201a, 201b, and 201c, conditional expression IDs 211a "X1", 211b "X2", and 211c "X3" that enable the respective conditional expressions to be uniquely identified. In addition, the search query analyzer 21 is configured to analyze the search query 200 and to extract the Boolean expression 202 "X1 AND (X2 OR X3)". In accordance with the above processing, the search query analyzer 21 extracts the conditional expressions 201 and the Boolean expression 202.

When the conditional expression 201 has a negative (NOT) logical operator, the search query analyzer 21 is configured to replace the negative logical operator with an expanded conditional expression. For example, when the conditional expression is "NOT (C1>10)", NOT is replaced with the evaluated conditional expression "(C≤10)". This makes possible a search using the Boolean expression determination table 26, which will be described further below.

The conditional expression processor 22 is configured to extract a record ID value conforming to a conditional expression 201 from the index 100 corresponding to the table T1 specified in the search query 200, and to create conditional expression conformity information 301 as a set comprising a conditional expression ID 211 and a record ID value. The information included in the conditional expression conformity information 301 is not limited thereto. For example, index 100 identification information or a record 101 update date may be included in the conditional expression conformity information 301.

Figure 5:
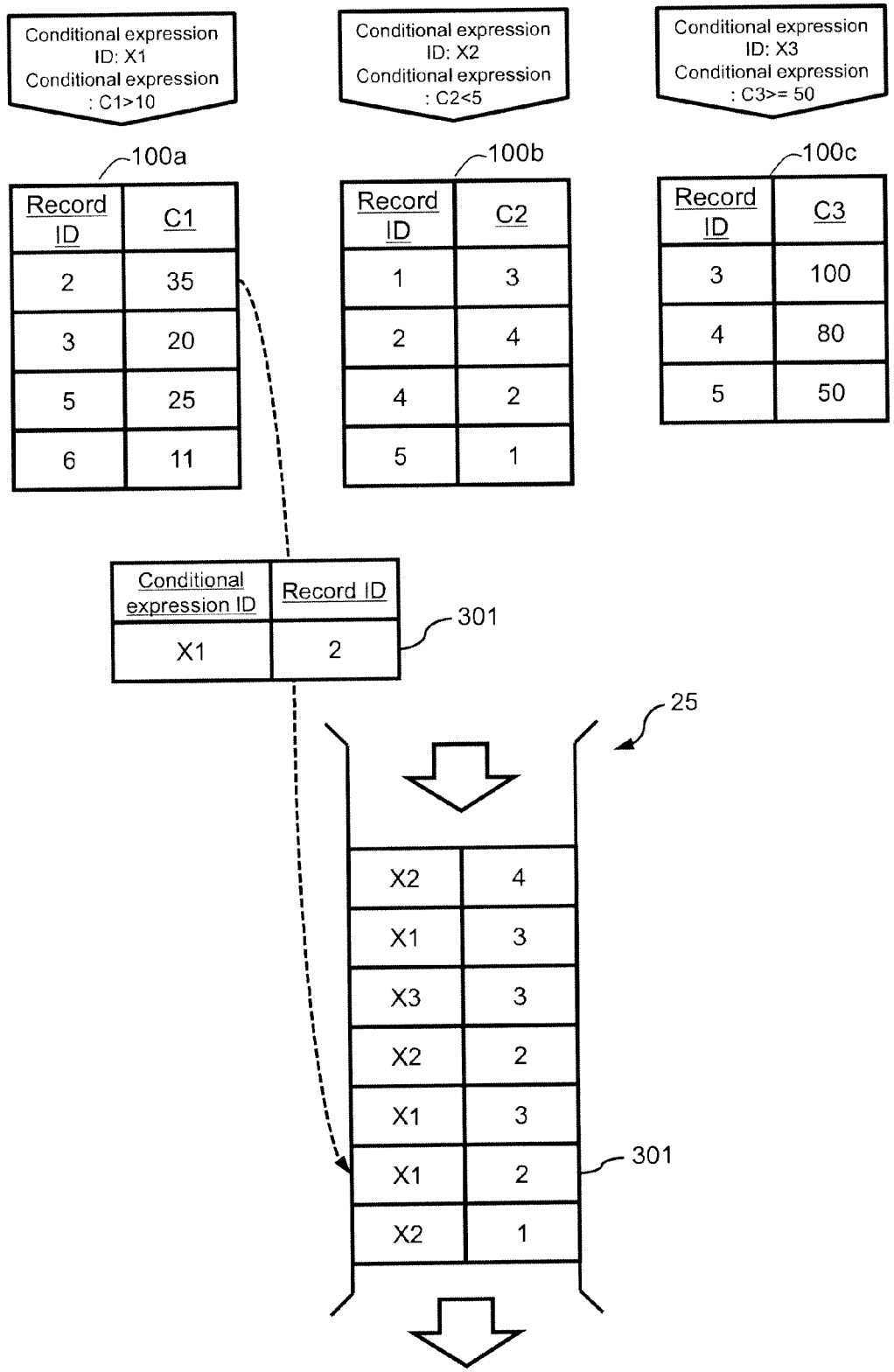
FIG. 5 shows an example of an overview of the processing of a conditional expression processor 22.

FIG. 5 shows an example of an overview of the processing of the conditional expression processor 22. The creation of the conditional expression conformity information 301 will be described hereinbelow using FIG. 5.

For example, the conditional expression processor 22 is configured to extract records 101b, 101c, 101e, and 101f for which the C1 value is "C1>10", and to extract the record ID values "2", "3", "5", "6" of the respective records. Then, the conditional expression processor 21, for example, creates conditional expression conformity information 301 as a set comprising "X1" of the conditional expression ID 211a corresponding to the conditional expression 201a and the extracted record ID value "2" for the record ID value "2". Then, the conditional expression determination part 21 outputs the created conditional expression conformity information 301 to the conditional expression conformity information manager 25. The conditional expression determination part 21 similarly creates the conditional expression conformity information 301 for the other conditional expressions 201b and 201c as well, and outputs this information 301 to the conditional expression conformity information manager 25. The conditional expression conformity information 25 will be described further below.

The search query analyzer 21 is configured to create a Boolean expression determination table 26 in the memory 5 on the basis of the extracted conditional expressions 201. That is, the search query analyzer 21 is configured to reserve a memory area for creating the Boolean expression determination table 26 in the memory 5. At this time, the search query analyzer 21 calculates a maximum number of entry-enabled records in the Boolean expression determination table 26, and makes this calculated value the maximum number of records. The maximum number of records is determined by the memory size (for example, the size of either the entire area or a prescribed area of the memory 5) and the number of extracted conditional expressions 201. For example, in a prescribed memory size, a small number of extracted conditional expressions 201 results in a small number of columns 410 in the Boolean expression determination table 26, thereby increasing the free capacity of the memory 5 by that much and consequently increasing the maximum number of records. Conversely, in a prescribed memory size, a large number of extracted conditional expressions 201 results in a large number of columns 410 in the Boolean expression determination table 26, thereby decreasing the free capacity of the memory 5 by that much and consequently decreasing the maximum number of records.

When the extraction of all the record IDs conforming to the conditional expressions 201 has been completed, the conditional expression processor 21 is configured to create conditional-expression-completion information indicating the completion of the conditional expression processing, and to output this information to the conditional expression conformity information manager 25. The conditional-expression-completion information, for example, may include its own conditional expression ID (ID of conditional expression 201 for which the extraction of all record IDs has been completed) and a character string indicating completion.

The conditional expression processor 21 may be configured to execute an independent process for each conditional expression 201 (that is, multitasking). For example, there are three conditional expressions 201 shown in FIG. 5, and as such, three independent conditional expression processor 21 processes may be executed.

The conditional expression conformity information manager 25, for example, is an area (for example, a buffer or a queue) in which information is input and output using an FIFO (First-in, First-out) format, and is configured in the memory 5. The conditional expression conformity information 301 output from the conditional expression processor 21 is buffered in the conditional expression conformity information manager 25. When the conditional expression processor 21 is executed in accordance with independent processes, the respective conditional expression conformity information 301 output from the conditional expression processor 21 is buffered in one conditional expression conformity information manager 25. When the conditional expression conformity information 301 has been buffered, the conditional expression conformity information manager 25 may notify the Boolean expression processor 23 to the effect.

The Boolean expression processor 23 is configured to change the values of "conditional expression ID" columns 410b through 410d of the Boolean expression determination table 26 on the basis of the conditional expression conformity information 301. The Boolean expression processor 23 is configured to perform logical operations for each record 401 in the Boolean expression determination table 26 by substituting the values of the "conditional expression ID" columns 410b through 410d in the Boolean expression 202, and to register the results thereof in a "logical operation result" column 410e.

FIG. 6 shows an example of the Boolean expression determination table 26.

The Boolean expression determination table 26 is configured from a plurality of records 401 having a "record ID" column 410a, "conditional expression ID" columns 410b through 410d, and a "logical operation result" column 410e. The Boolean expression determination table 26 may have columns 410 besides these columns. For example, a column 410 having a hash value calculated from a record ID value may be added to the Boolean expression determination table 26 to speed up retrieval. The information in the Boolean expression determination table 26 does not necessarily have to be stored in table format.

The Boolean expression processor 23 is configured to acquire the conditional expression conformity information 301 from the conditional expression conformity information manager 25 and to extract a conditional expression ID (for example, "X1") and a record ID value (for example, "2") from this information 301. Then, the Boolean expression processor 23 is configured to retrieve, from the Boolean expression determination table 26, the record 401b having the extracted record ID value (for example, "2") in the "record ID" column 410a. The Boolean expression determination part 23 is configured to change the value of column 410 of the above-mentioned extracted conditional expression ID (for example, "X1") from "false" to "true" in the record 401b that was found. When a record ID value could not be found in the "record ID" column 410a, the Boolean expression processor 23 either adds a new entry to the Boolean expression determination table 26, or stores the conditional expression conformity information 301 in the storage apparatus 2 and causes the sorting processor 28 to execute a search. This process will be described further below.

The Boolean expression determination part 23 is configured to perform a logical operation by substituting in the Boolean expression 202 the values of the "conditional expression ID: X1" column 410b, the "conditional expression ID: X2" column 410c, and the "conditional expression ID: X3" column 410d in the record of the same record ID (for example, 401b). For example, in the case of record 401b, the logical operation "true AND (true OR false)" is executed, consequently resulting in the logical operation result of "true". The Boolean expression processor 23 is configured to register the value of the logical operation result (for example, "true") in the "logical operation result" column 410e in the record of the same record ID (for example, 401b).

The Boolean expression processor 23 is configured to output Boolean expression conformity information 302 including the record ID value of the record 401 for which the logical operation result is "true" to the Boolean expression conformity information manager 27.

The Boolean expression processor 23 may be configured to delete from the Boolean expression determination table 26 a record in which the value of the result of the logical operation in all the conditional expression ID columns 410b through 410d is "true". Since this reduces the number of records currently in the logical determination table 26, the number of records for which new entries are possible increases in the logical determination table 26. That is, the number of new entry-enabled records, which is the difference between the maximum number of records and the current number of records, increases. This makes it possible to shorten the time required for retrieval processing since more records can be processed in memory. Furthermore, records in which the value "true" is registered in all the conditional expression ID columns 410b through 410d may be deleted at the time the value "true" has been registered in all the conditional expression ID columns 410b through 410d, or the existence of such records may be checked regularly and detected records may be deleted at the time such records are detected.

The Boolean expression processor 23 is configured to judge that the processing for reflecting the conditional expression conformity information 301 in the Boolean expression determination table 26 has been completed when all the condition-completion information has been acquired from the conditional expression processor 22. Then, when all of its own processing has been completed, the Boolean expression processor 23 is configured to output to the Boolean expression conformity information manager 27 logic-completion information indicating that the processing of the Boolean expression processor 23 has been completed. This processing will be described further below.

The Boolean expression conformity information manager 27, for example, is an area (for example, either a buffer or a queue) for information to be input and output in FIFO format, and is configured in the memory. The Boolean expression conformity information 302 output from the Boolean expression processor 23 is buffered in the Boolean expression conformity information manager 27. The record ID value of a record 401 for which the value of the logical operation result 410e is "true" is included in the Boolean expression conformity information 302. The Boolean expression conformity information manager 27 may be configured so that, when the Boolean expression conformity information 302 has been buffered, a notification to this effect is sent to the search result generator 24.

The search result generator 24 is configured to acquire the Boolean expression conformity information 302 from the Boolean expression conformity information manager 27, and to extract a record having this record ID value from the table T1 on the basis of the record ID values included in the Boolean expression conformity information 302.

Figure 7:
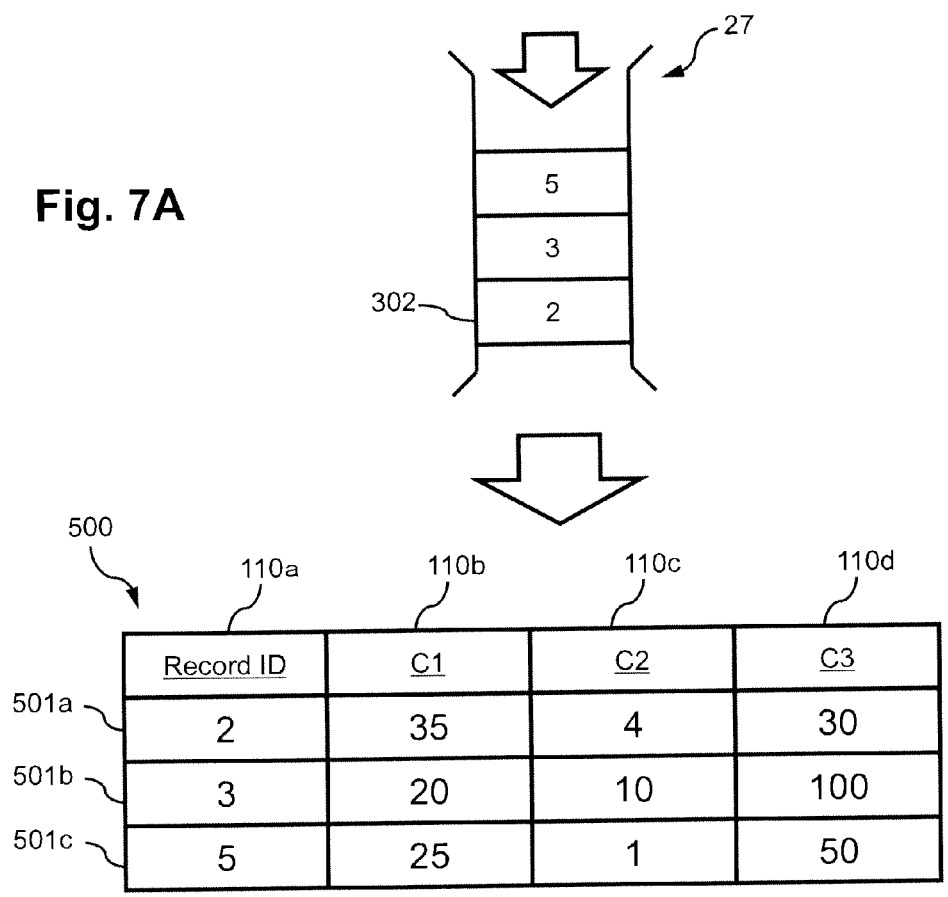
FIG. 7A shows an example of an overview of the processing of a search result generator 24.
FIG. 7B shows an example of a record ID list 601.

FIG. 7A shows an example of an overview of the processing of the search result generator 24.

The search result generator 24 is configured to acquire one piece of Boolean expression conformity information 302 from the Boolean expression conformity information manager 27, and to extract the record having this record ID value from the table T1. The search result generator 24 is configured to register the record extracted from the table T1 (more accurately, the information extracted from the record in table T1) in a search result table 500.

For example, in FIG. 7A, the search result generator 24 acquires the Boolean expression conformity information 302 having the record ID value "2" from the Boolean expression conformity information manager 27. Then, the search result generator 24 extracts the record 101b having the record ID value "2" from the table T1. The search result generator 24 then registers the extracted record 101*b* in the search result table 500 (record 501*a*). The search result generator 24 performs the same processing for other Boolean expression conformity information 302 as well. In accordance with the above processing, the search result generator 24 creates the search result table 500.

Not all of the conditional expression conformity information 301 outputted from the conditional expression conformity information manager 25 is necessarily reflected in the Boolean expression determination table 26 immediately. For example, the conditional expression determination part 21 must add a record corresponding to the record ID value of the conditional expression conformity information 301 acquired from the conditional expression conformity information manager 25 to the Boolean expression determination table 26, but when the number of records comprising the Boolean expression determination table 26 has already reached a prescribed number (for example, the maximum number of records), a new record is not added to the Boolean expression determination table 26. In this case, the conditional expression determination part 21 is configured to register the record ID value of the conditional expression conformity information 301 in a record ID list 601 that corresponds to the conditional expression ID value of this information 301. FIG. 7B shows record ID lists 601*a* through 601*c* respectively corresponding to conditional expressions 201*a* through 201*c*. The record ID list 601 is configured from one or more entries. A record ID value is registered in an entry.

Figure 14:
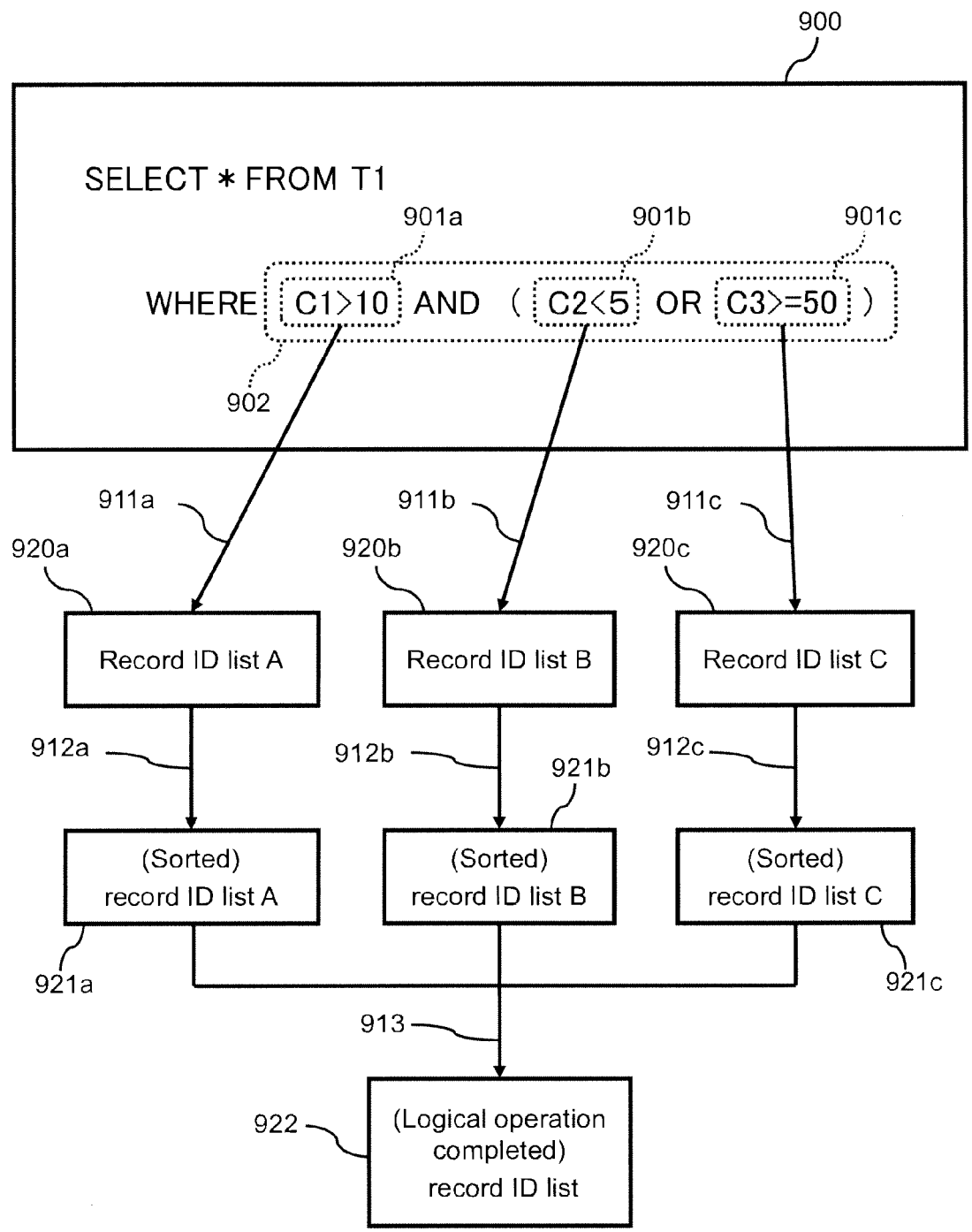
FIG. 14 shows an example of a conventional retrieval system.

When at least one record ID value from the record ID lists 601*a* through 601*c* is registered, the search result generator 24 is configured to cause the sorting processor 28 to perform a logical operation using the record ID lists 601*a* through 601*c*. Specifically, for example, the sorting processor 28 performs a logical operation in accordance with the Boolean expression 202 based on whether or not the same record ID value is in the lists 601*a* through 601*c*. In so doing, for example, when the record ID value is acquired from the list 601*a*, "true" is used for the conditional expression 201*a* in the Boolean expression 202. Conversely, for a list in which the same record ID value as this record ID value has not been acquired, "false" is used for the conditional expression corresponding to this list in the Boolean expression 202. Then the search result generator 24 extracts from the table T1 a record having a record value that conforms to the record ID value (the record ID value corresponding to the Boolean expression 202) identified by the sorting processor 28. The search result generator 24 is configured to create a search result table 500 that includes the record extracted from the table T1 (more accurately, the information extracted from the record in the index 100). The output data from the sorting processor 28 may be the Boolean expression conformity information 302. However, the sorting processor 28 may create the Boolean expression conformity information 302 by any processing operations. The sorting processor 28, for example, may be configured to create the Boolean expression conformity information 302 on the basis of the conventional system described using FIG. 14, or may create the Boolean expression conformity information 302 on the basis of a system identical to that of the Boolean expression processor 23 described in this embodiment.

Figure 8:
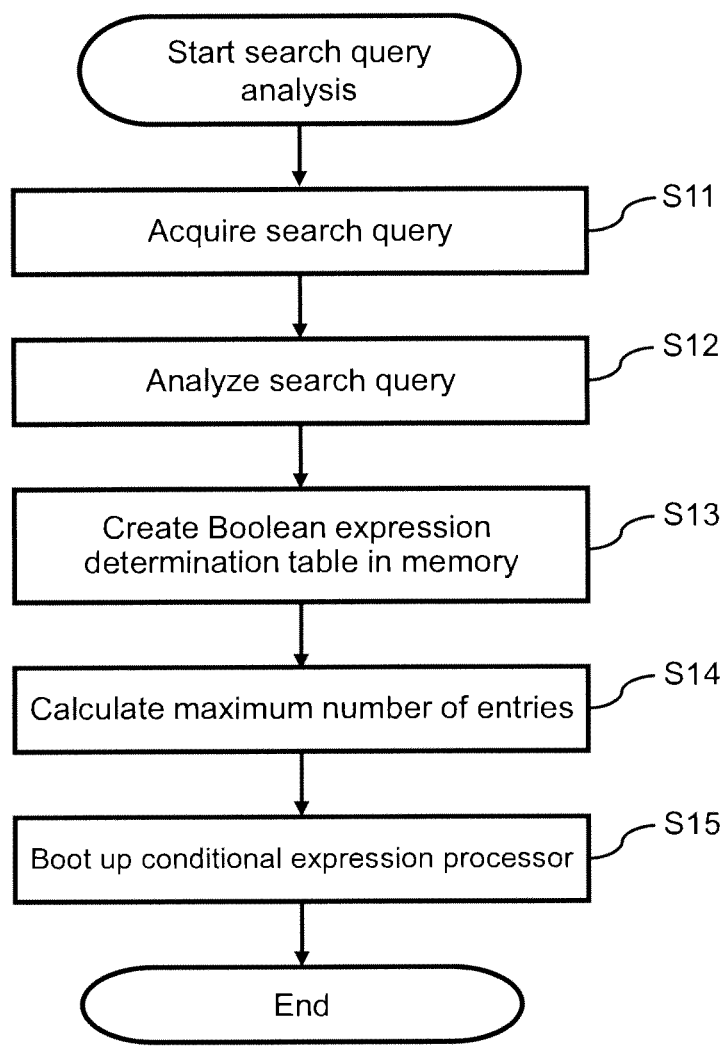
FIG. 8 shows an example of the flow of processing of a search query analyzer 21.

FIG. 8 shows an example of the flow of processing of the search query analyzer 21.

The search query analyzer 21 is configured to acquire a search query 200 that has been inputted from the terminal 3 (S11).

The search query analyzer 21 is configured to analyze the acquired search query 200 and to extract the conditional expression 201 and the Boolean expression 202 (S12).

The search query analyzer 21 is configured to create the Boolean expression determination table 26 in the memory on the basis of the extracted conditional expression 201 and Boolean expression 202 (S13).

The search query analyzer 21 is configured to calculate the maximum number of entries on the basis of the created Boolean expression determination table 26 (S14).

The search query analyzer 21 is configured to boot up the conditional expression processor 22 (S15), and to end the search query analyzing process.

When a plurality of conditional expressions 201 exists, the conditional expression processor 22 may be configured to start a process for each conditional expression 201.

In accordance with the above processing, a conditional expression 201 and a Boolean expression 202 are extracted from the search query 200, and the conditional expression processor 22 is booted up.

Figure 9:
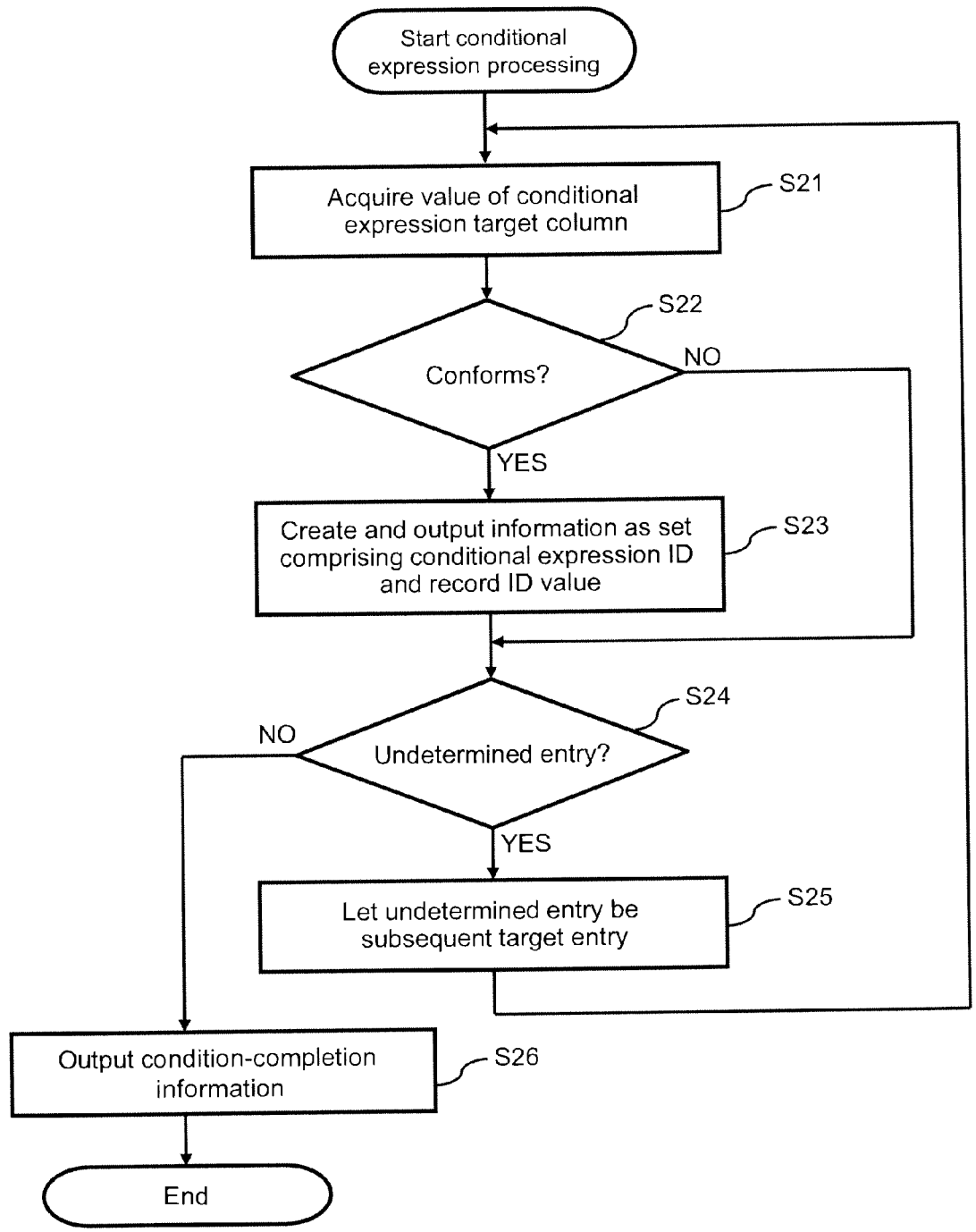
FIG. 9 shows an example of the flow of processing of the conditional expression processor 22.

FIG. 9 shows an example of the flow of processing of the conditional expression processor 22.

The conditional expression processor 22 is configured to extract one entry that is the determination target of a conditional expression 201 (hereinafter, referred to as "target entry") from the index 100 corresponding to the conditional expression 201, and to acquire from the target entry a column value that is the target of the conditional expression 201 (hereinafter referred to as "target column value") (S21).

The conditional expression processor 22 is configured to determine whether or not the target column value conforms to the conditional expression 201 (S22).

When the target column value conforms to the conditional expression 201 (S22: YES), the conditional expression processor 22 is configured to create conditional expression conformity information 301 as a set comprising the conditional expression ID 211 corresponding to the conditional expression 201 and the target entry record ID value, and to output this information 301 to the conditional expression conformity information manager 25 (S23). The conditional expression processor 22 then advances the processing to Step S24.

Conversely, when the target column value does not conform to the conditional expression 201 (S22: NO), the conditional expression determination part 22 advances the processing to Step S24.

The conditional expression determination part 22 is configured to determine whether or not undetermined records 101 exist in the index 100 (S24).

When undetermined records 101 exist (S24: YES), the conditional expression determination part 22 is configured to regard one of the undetermined records 101 as the next target entry 101 (S25), and to return to the processing of Step S21.

Conversely, when undetermined records 101 do not exist (S24: NO), the conditional expression determination part 22 is configured to output condition-completion information to the conditional expression conformity information manager 25 (S26), and to end the conditional expression processing.

In accordance with the above processing, conditional expression conformity information 301 that includes a record ID value conforming to the conditional expression 201 is buffered from the index 100 to the conditional expression conformity information manager 25.

Figure 10:
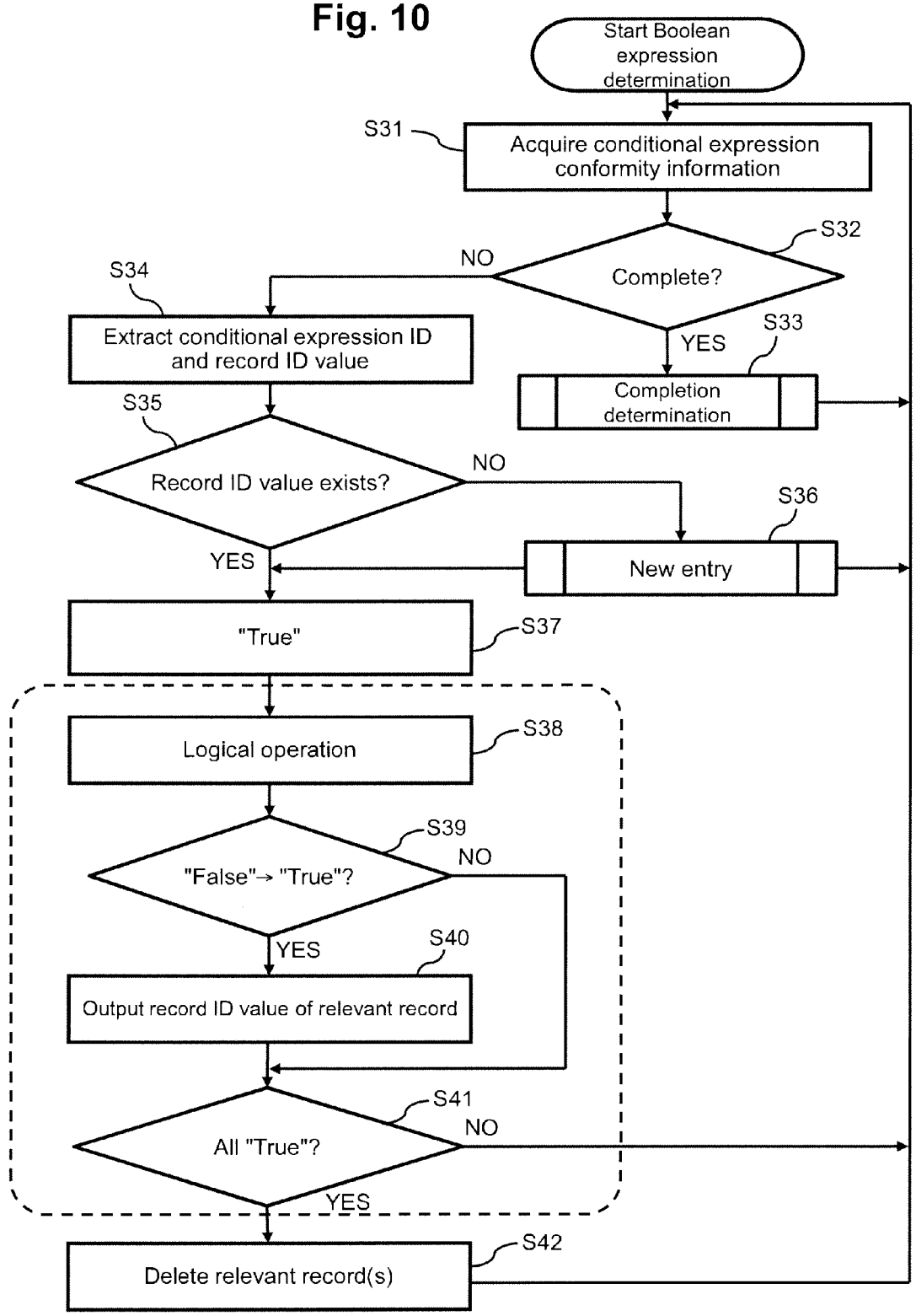
FIG. 10 shows an example of the flow of processing of a Boolean expression processor 23.

FIG. 10 shows an example of the flow of processing of the Boolean expression processor 23.

The Boolean expression processor 23 is configured to acquire the conditional expression conformity information 301 from the conditional expression conformity information manager 25 (S31). The acquired conditional expression conformity information 301 is deleted from the conditional expression conformity information manager 25.

The Boolean expression processor 23 is configured to determine whether or not the acquired conditional expression conformity information 301 is condition-completion information (S32).

When the information 301 is condition-completion information (S32: YES), the Boolean expression processor 23 is configured to execute a completion determination process (S33). The completion determination process will be described further below.

Conversely, when the information 301 is not condition-completion information (S32: NO), the Boolean expression processor 23 is configured to extract a conditional expression ID 211 and a record ID value from the conditional expression conformity information 301 (S34).

The Boolean expression processor 23 is configured to determine whether or not a record ID value exists in the "record ID" column 410a of the Boolean expression determination table 26 (S35).

When a record ID value does not exist in the "record ID" column 410a (S35: NO), the Boolean expression processor 23 is configured to execute a new entry creation process (S36). The new entry creation process will be described further below.

When a record ID value exists in the "record ID" column 410a (S35: YES), the Boolean expression processor 23 is configured to change the value of the "conditional expression ID" column 410 to "true" in the record 401 having this record ID value (S37).

The Boolean expression processor 23 is configured to perform a logical operation by substituting the value of each "conditional expression ID" column in the Boolean expression 202, and to register the results in the "logical operation result" column 410e (S38).

When the logical operation result changes from "false" to "true" (S39: YES), the Boolean expression processor 23 is configured to create Boolean expression conformity information 302 that includes the record ID value of the record 401 for which this logical operation result is "true", and to output this information 302 to the Boolean expression conformity information manager 27 (S40). The Boolean expression processor 23 then advances the processing to Step S41.

When the logical operation result either remains "false" or remains "true" (S39: NO), the Boolean expression processor 23 advances the processing of Step S41 as-is.

The Boolean expression processor 23 is configured to determine whether or not all the values in the "conditional expression ID" columns are "true" in this record 401 (S41).

When any of the values in the "conditional expression ID" columns is not "true" (S41: NO), the Boolean expression processor 23 returns to the processing of Step S31.

When all the values in the "conditional expression ID" columns are "true" (S41: YES), the Boolean expression processor 23 advances the processing of Step S42 as-is.

The Boolean expression processor 23 is configured to delete this record 401 from the Boolean expression determination table 26 (S42), and to return to the processing of Step S31.

Figure 11:
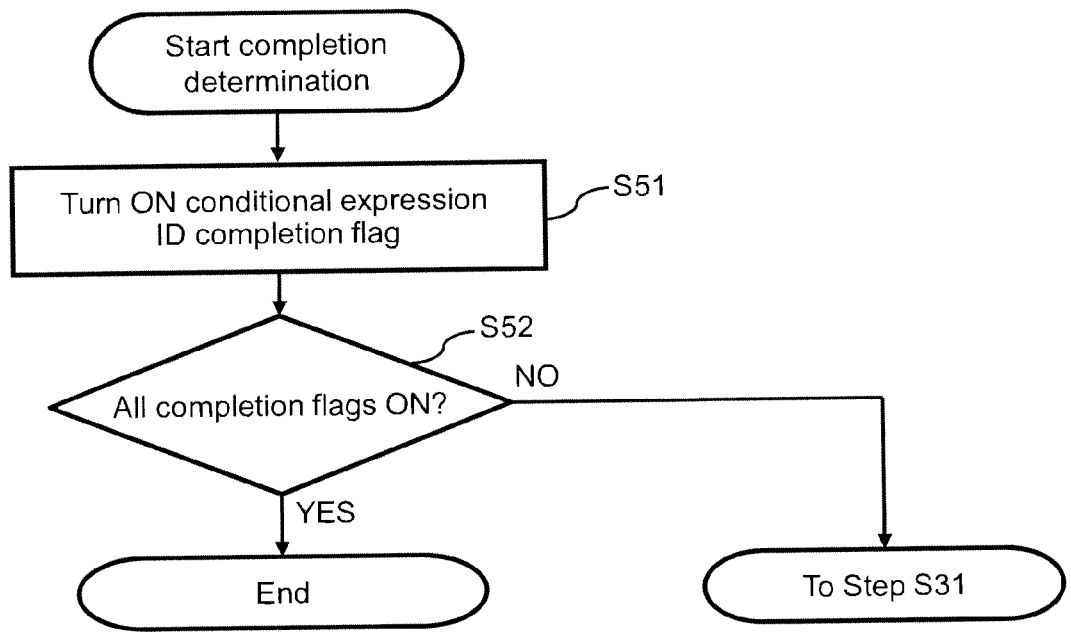
FIG. 11 shows an example of the flow of processing of a completion determination in the Boolean expression processor 23.

FIG. 11 shows an example of the flow of processing of a completion determination (S33 in FIG. 10) in the Boolean expression processor 23.

The Boolean expression processor 23 is configured to turn ON a completion flag corresponding to the conditional expression ID 211 included in the condition-completion information (S51). The completion flag is OFF until the condition-completion information is acquired.

The Boolean expression processor 23 is configured to determine whether or not all of the completion flags corresponding to the respective conditional expression IDs 211 are ON (S52). That is, when it is assumed that there is a conditional expression processor 23 process for each conditional expression 211, the Boolean expression processor 23 determines whether or not the processing for all the processes has been completed.

When any of the completion flags is OFF (S52: NO), the Boolean expression processor 23 is configured to return to the processing of Step S31 in FIG. 10.

Conversely, when all of the completion flags are ON (S52: YES), the Boolean expression processor 23 is configured to advance to Step S53. That is, the Boolean expression processor 23 determines that all of the conditional expression conformity information 301 has been reflected in the Boolean expression determination table 26, and ends the Boolean expression determination processing.

Figure 12:
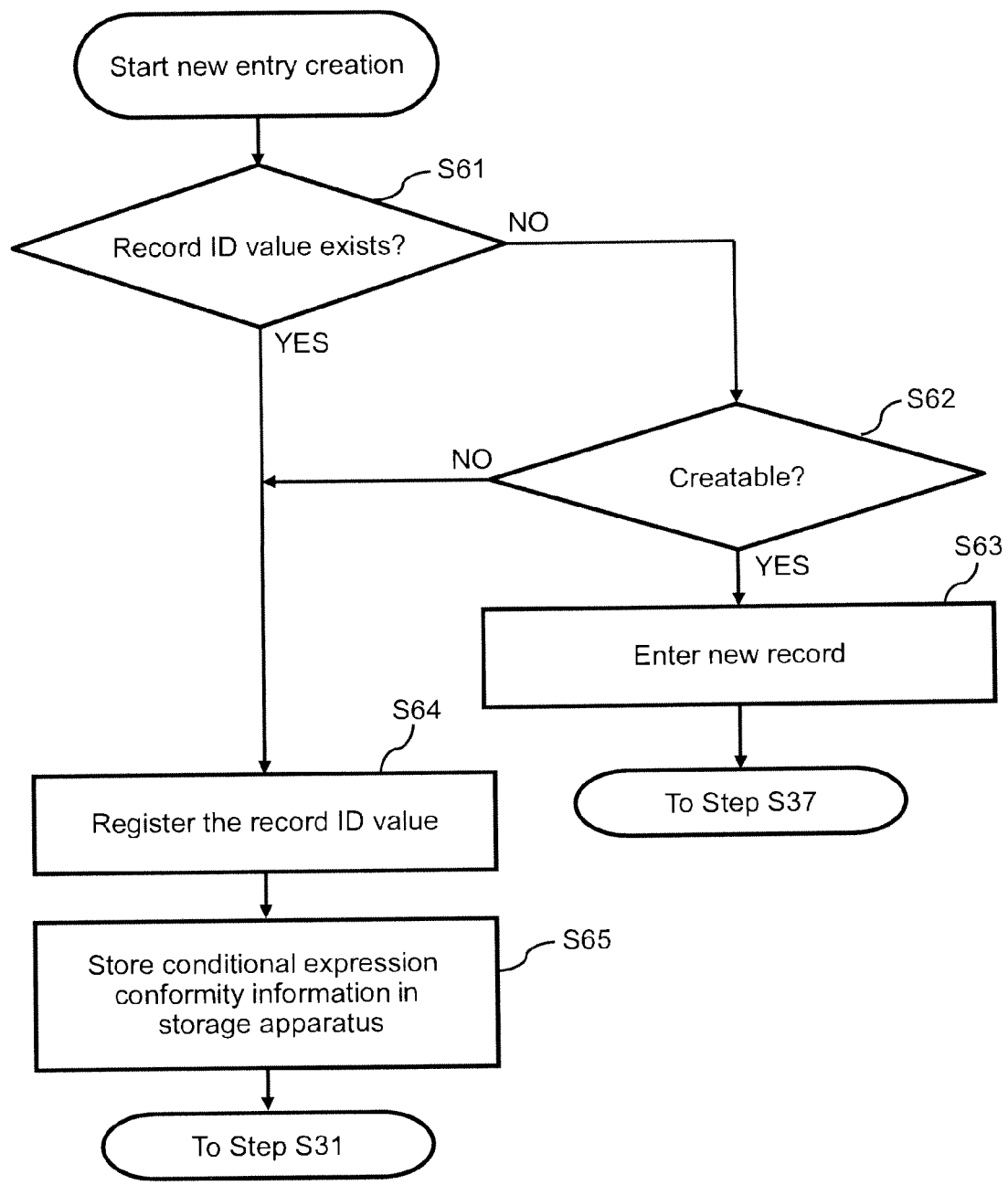
FIG. 12 shows an example of the flow of processing for creating a new entry in the Boolean expression processor 23.

FIG. 12 shows an example of the flow of processing for creating a new entry (S36 of FIG. 10) in the Boolean expression processor 23.

The Boolean expression processor 23 is configured to determine whether or not the record ID value acquired from the conditional expression conformity information manager 25 exists in a storage apparatus storage list (not shown in the drawing) (S61). The record ID values registered in the record ID list 601 inside the storage apparatus 2 up until this point are stored in the storage apparatus storage list. This prevents conditional expression conformity information 301 having the same record ID value from being distributed in the storage apparatus 2 with the Boolean expression determination table 26. The storage apparatus storage list, for example, is stored in the memory 5.

When a record ID value does not exist in the storage apparatus storage list (S61: NO), the Boolean expression processor 23 is configured to determine whether or not a new record 401 can be created in the Boolean expression determination table 26 (S62). That is, the Boolean expression processor 23 determines whether or not the number of records currently in the Boolean expression determination table 26 (hereinafter referred to as "current number of records") is smaller than the maximum number of records.

When a new record 401 is capable of being created (S62: YES), that is, when the current number of records is smaller than the maximum number of records, the Boolean expression processor 23 is configured to create a new record 401 having the acquired record ID value, and to enter this new record 401 in the Boolean expression determination table 26 (S63). At this time, the Boolean expression processor 23 increments the current number of records (count value) by 1. In addition, the Boolean expression processor 23 sets all the values of the "condition ID" columns 410 of the new record 401 that has been entered to "false" at this time. The Boolean expression processor 23 then advances to Step S37 of FIG. 10.

Conversely, when the acquired record ID value exists in the storage apparatus storage list (S61: YES), or when a new record 401 is not capable of being created (S62: NO), the Boolean expression processor 23 is configured to advance to Step S64 for storing the condition conformity information 301 in the storage apparatus 2.

The Boolean expression processor 23 is configured to register the extracted record ID value in the record ID list (S64). When this record ID value has yet to be registered in the storage apparatus storage list at this time, the Boolean expression processor 23 registers this record ID value in the storage apparatus storage list.

Then, the Boolean expression processor 23 is configured to store the conditional expression conformity information 301 in the storage apparatus 2 (S65), and to return to the processing of Step S31 of FIG. 10.

In accordance with the above processing, the conditional expression conformity information 301 extracted by the conditional expression processor 22 can be reflected in the Boolean expression determination table 26. In addition, conditional expression conformity information 301 not reflected in the Boolean expression determination table 26 can be stored in the storage apparatus 2.

Figure 13:
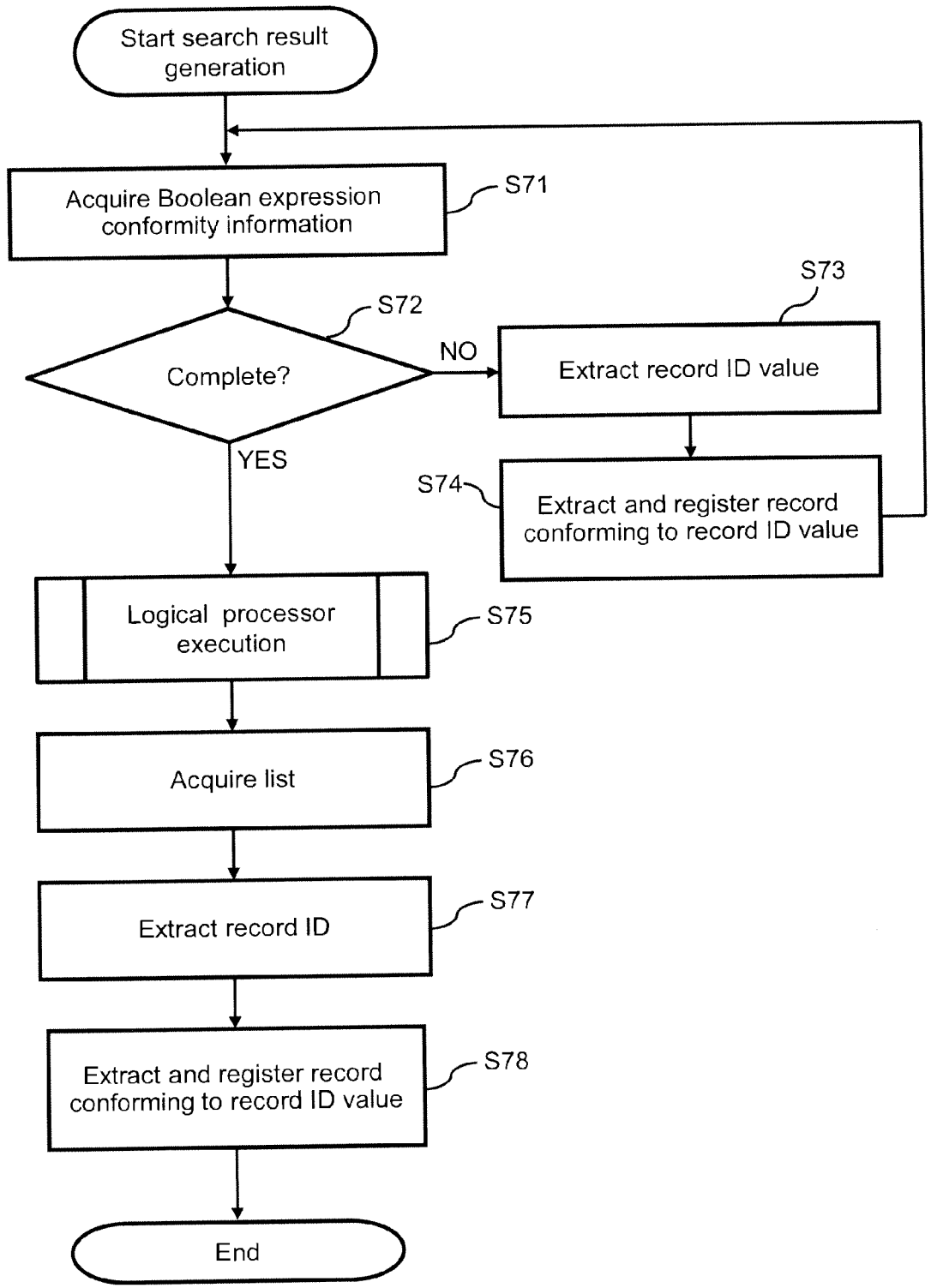
FIG. 13 shows an example of the flow of processing of the search result generator 24.

FIG. 13 shows an example of the flow of processing of the search result generator 24.

The search result generator 24 is configured to acquire the Boolean expression conformity information 302 from the Boolean expression conformity information manager 27 (S71). The acquired Boolean expression conformity information 302 is deleted from the Boolean expression conformity information manager 27.

The search result generator 27 is configured to determine whether or not the acquired Boolean expression conformity information 302 is logic-completion information (S72).

When logic-completion information has not been acquired (S72: NO), the search result generator 24 is configured to extract a record ID value from the Boolean expression conformity information 302 (S73).

Then, the search result generator 27 is configured to extract a record having this record ID value from the table T1, and to register this record in the search result table 500 (S74). The search result generator 24 then returns to the processing of Step S71.

Conversely, when logic-completion information has been acquired (S72: YES), the search result generator 24 is configured to determine that all the processing for the Boolean expression conformity information 302 buffered in the Boolean expression conformity information manager 27 has been completed. The search result generator 24 then advances to Step S75 for transitioning to the processing of the Boolean expression conformity information 302 stored in the storage apparatus.

The search result generator 24 is configured to request that the sorting processor 28 perform logical operation processing on the conditional expression conformity information 301 stored in the storage apparatus 11 (S75).

The search result generator 24 is configured to acquire a list of Boolean expression conformity information 302 conforming to the Boolean expression 202 from a storage apparatus logical processor 28 (S76). This Boolean expression conformity information 302 also includes the record ID value of the record conforming to the Boolean expression 202 the same as described hereinabove.

The search result generator 24 is configured to extract the record ID value from the Boolean expression conformity information 302 (S77).

The search result generator 27 is configured to extract the table T1 the record having this record ID value, to add and register this record in the search result table 500 (S78), and to end the search result generation process. That is, the record extracted by the storage apparatus logical processor 28 is added and registered in the search result table 500 created in Step S74.

In accordance with the above processing, a search result table 500 having both a record extracted by the Boolean expression processor 23 and a record extracted by the sorting processor 28 is created in the search result table 500. That is, a search result table 500 having records conforming to the search query 200 is created in the search result table 500.

The records corresponding to the records registered in the search result table 500 are deleted from the Boolean expression determination table 26. In this case, the DBMS 10 (for example, either the Boolean expression processor 23 or the search result generator 27) is configured to decrement the current number of records (count value) in the Boolean expression determination table 26 by 1.

According to the embodiment described hereinabove, a true/false for each conditional expression 201 is registered in the Boolean expression determination table 26 for each record ID value. Then, based on the Boolean expression 202 and a plurality of trues/falses respectively corresponding to a plurality of conditional expressions 201 for the same record ID, a determination is made as to whether or not this record ID is the ID of a record conforming to the search query 201. This makes it possible to shorten the time required for retrieval since it eliminates the need for sorting in accordance with accessing the storage apparatus 2.

According to the embodiment described hereinabove, a record ID value is stored in the storage apparatus 2 without being written to the Boolean expression determination table 26 only when the number of records comprising the Boolean expression determination table 26 has already reached a prescribed number. A retrieval process requiring input/output to/from the storage apparatus 2 is performed only for a record ID value stored in the storage apparatus 2. That is, sorting in accordance with accessing the storage apparatus 2 can be minimized. In other words, in this embodiment, a retrieval process that requires sorting in accordance with accessing the storage apparatus 2 does not always have to be performed. Even when the current number of records has reached the prescribed number, the record ID value is not registered in the storage apparatus 2 unless a record must be added to the Boolean expression determination table 26.

The embodiments of the present invention described hereinabove are illustrations for describing the present invention, and do not purport to limit the scope of the present invention to these embodiments. A person skilled in the art will be able to put the present invention into practice in a variety of other modes without departing from the gist of the present invention.

For example, the index 100 may be eliminated. In this case, the column value used to determine whether or not there is conformance with the conditional expression 201 may be acquired from the table T1.

The plurality of record ID lists 601 respectively corresponding to the plurality of conditional expressions 201 may be merged into a single list.

REFERENCE SIGNS LIST

1 DB management apparatus
2 Storage apparatus
5 Memory
10 DBMS
11 DB
21 Search query analyzer
22 Conditional expression processor
23 Boolean expression processor
24 Search result generator
25 Conditional expression conformity information manager
26 Boolean expression determination table
27 Boolean expression conformity information manager
28 Sorting processor
100 Table
200 Search query

The invention claimed is:

1. A database management apparatus, comprising:
an interface device configured to receive a search query;
a first storage apparatus that inputs and outputs data faster than a second storage apparatus;
a processor connected to the interface device and the first storage device, wherein
the processor is configured to:
identify a Boolean expression and respective conditional expressions from a search query by analyzing the search query, in which is described the Boolean expression constituted in a combination of a plurality of conditional expressions;
extract the value of a record ID conforming to the conditional expression for each of the identified conditional expressions;
change a conformity result value corresponding to the extracted record ID value and the conditional expression to a first value signifying conformity, in Boolean expression determination information, which is information including a determination set having the value of a record ID and a plurality of conformity result values respectively corresponding to the plurality of conditional expressions and which is stored in the first storage apparatus, and perform a first logical operation on a plurality of conformity result values of the determination set for each determination set in the Boolean expression determination information on the basis of the Boolean expression; and
retrieve, from a table that is specified in the search query and is in the second storage apparatus, a record corresponding to a record ID value conforming to a record ID value of a determination set in which a first value signifying conformity is obtained as the result of the first logical operation, and output search result information related to this search result, wherein the table is stored in the second storage apparatus; and
determine whether or not a new determination set can be added to the Boolean expression determination information when the extracted record ID value does not conform to any of the record ID values of the Boolean expression determination information; and
when the determination result is negative, to store the extracted record ID value in the second storage apparatus as a record ID value corresponding to the conditional expression, and wherein
the processor is configured to execute the Boolean expression logical operation as a second logical operation on this record ID value based on whether a record ID value stored in the second storage apparatus corresponds to any of the plurality of conditional expressions, and
the processor is configured to retrieve, from a table specified in the search query, a record corresponding to a record ID value for which a first value signifying conformity is obtained as the result of the first logical operation and a record corresponding to a record ID value for which a first value signifying conformity is obtained as the result of the second logical operation, and to output search result information related to the result of this search.

2. A database management apparatus according to claim 1, wherein
when the result of the determination is affirmative, the processor is configured to add a new determination set having the extracted record ID value to the Boolean expression determination table, and to make the determination as to whether or not a new determination set can be added to the Boolean expression determination information based on whether or not the number of determination sets included in the Boolean expression determination information is equal to or less than a prescribed number.

3. A database management apparatus according to claim 2, wherein the processor is configured to delete from the Boolean expression determination information a determination set in which all of the plurality of conformity result values are the first value in the Boolean expression determination information.

4. A database management apparatus according to claim 3, wherein
when the determination result is affirmative, the processor is configured to add a new determination set having the extracted record ID value to the Boolean expression determination table in a case where the extracted record ID value is not stored in the second storage apparatus, and to store the extracted record ID value in the second storage apparatus in a case where the extracted record ID value is stored in the storage area in the second storage apparatus.

5. A database management apparatus according to claim 4, wherein the first storage apparatus is configured to input and output data faster than the second storage apparatus.

6. A database management apparatus according to claim 1, wherein
when the determination result is affirmative, the processor is configured to add a new determination set having the extracted record ID value to the Boolean expression determination table in a case where the extracted record ID value is not stored in the second storage apparatus, and to store the extracted record ID value in the second storage apparatus in a case where the extracted record ID value is stored in the storage area in the second storage apparatus.

7. A database management method, comprising:
identifying, by a processor, a Boolean expression and respective conditional expressions from a search query by analyzing the search query, in which is described the Boolean expression constituted in a combination of a plurality of conditional expressions;
extracting, by the processor, for each of the identified conditional expressions the value of a record ID conforming to the conditional expression;
changing, by the processor, a conformity result value corresponding to the extracted record ID value and the conditional expression to a first value signifying conformity, in Boolean expression determination information, which is information including a determination set having the value of a record ID and a plurality of conformity result values respectively corresponding to the plurality of conditional expressions, and, on the basis of the Boolean expression, performing, by the processor, a first logical operation on a plurality of conformity result values of the determination set, for each determination set in the Boolean expression determination information; and
retrieving, by the processor, from a table specified in the search query, a record corresponding to a record ID value conforming to a record ID value of a determination set in which a first value signifying conformity is obtained as the result of the first logical operation, and outputting search result information related to this search result, wherein the table is stored in a second storage apparatus; and determining, by the processor, whether or not a new determination set can be added to the Boolean expression determination information when the extracted record ID value does not conform to any of the record ID values of the Boolean expression determination information, wherein the Boolean expression determination information is stored in a first storage apparatus; and when the determination result is negative, storing the extracted record ID value the second storage apparatus as a record ID value corresponding to the conditional expression, executing the Boolean expression logical operation as a second logical operation on this record ID value based on whether a record ID value stored in the second storage apparatus corresponds to any of the plurality of conditional expressions, and retrieving, by the processor, from a table specified in the search query, a record corresponding to a record ID value for which a first value signifying conformity is obtained as the result of the first logical operation and a record corresponding to a record ID value for which a first value signifying conformity is obtained as the result of the second logical operation, and outputting search result information related to the result of this search.

8. A database management apparatus, comprising:

an interface device configured to receive a search query;

a first storage apparatus that inputs and outputs data faster than a second storage apparatus; and a processor connected to the interface device and the first storage device, wherein the processor is configured to:

identify a Boolean expression and respective conditional expressions from a search query by analyzing the search query, in which is described the Boolean expression constituted in a combination of a plurality of conditional expressions;

extract the value of a record ID conforming to the conditional expression for each of the identified conditional expressions;

change a conformity result value corresponding to the extracted record ID value and the conditional expression to a first value signifying conformity, in Boolean expression determination information, which is information including a determination set having the value of a record ID and a plurality of conformity result values respectively corresponding to the plurality of conditional expressions and which is stored in the first storage apparatus, and perform a logical operation on a plurality of conformity result values of the determination set for each determination set in the Boolean expression determination information on the basis of the Boolean expression; and retrieve, from a table that is specified in the search query and is in the second storage apparatus, a record corresponding to a record ID value conforming to a record ID value of a determination set in which a first value signifying conformity is obtained as the result of the logical operation, and output search result information related to this search result, wherein the processor is configured to determine whether or not a new determination set can be added to the Boolean expression determination information when the extracted record ID value does not conform to any of the record ID values of the Boolean expression determination information, and when the determination result is affirmative, to add a new determination set having the extracted record ID value to the Boolean expression determination table, wherein the determination as to whether or not a new determination set is added to the Boolean expression determination information is made based on whether or not the number of determination sets included in the Boolean expression determination information is equal to or less than a prescribed number.

9. A database management method, comprising:

identifying, by a processor, a Boolean expression and respective conditional expressions from a search query by analyzing the search query, in which is described the Boolean expression constituted in a combination of a plurality of conditional expressions;

extracting, by the processor, for each of the identified conditional expressions the value of a record ID conforming to the conditional expression;

changing, by the processor, a conformity result value corresponding to the extracted record ID value and the conditional expression to a first value signifying conformity, in Boolean expression determination information, which is information including a determination set having the value of a record ID and a plurality of conformity result values respectively corresponding to the plurality of conditional expressions, and, on the basis of the Boolean expression, performing, by the processor, a logical operation on a plurality of conformity result values of the determination set, for each determination set in the Boolean expression determination information;

retrieving, by the processor, from a table specified in the search query, a record corresponding to a record ID value conforming to a record ID value of a determination set in which a first value signifying conformity is obtained as the result of the logical operation, and outputting search result information related to this search result;

determining, by the processor, whether or not a new determination set can be added to the Boolean expression determination information when the extracted record ID value does not conform to any of the record ID values of the Boolean expression determination information, and when the determination result is affirmative, adding, by the processor, a new determination set having the extracted record ID value to the Boolean expression determination table, wherein the determination as to whether or not a new determination set is added to the Boolean expression determination information is made based on whether or not the number of determination sets included in the Boolean expression determination information is equal to or less than a prescribed number.

* * * * *